(12) United States Patent
Becerra et al.

(10) Patent No.: US 10,536,047 B2
(45) Date of Patent: Jan. 14, 2020

(54) ELECTRIC MOTOR CONTROLLER FOR HIGH-MOISTURE APPLICATIONS AND METHOD OF MANUFACTURE

(71) Applicant: Regal Beloit America, Inc., Beloit, WI (US)

(72) Inventors: Roger Carlos Becerra, Fort Wayne, IN (US); Ming Li, Fort Wayne, IN (US); Mohamad Khalil Dahouk, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 302 days.

(21) Appl. No.: 15/135,008

(22) Filed: Apr. 21, 2016

(65) Prior Publication Data

US 2017/0310187 A1    Oct. 26, 2017

(51) Int. Cl.
| | | |
|---|---|---|
| *H02K 15/12* | (2006.01) | |
| *H02K 5/10* | (2006.01) | |
| *H02K 11/01* | (2016.01) | |
| *H02K 11/33* | (2016.01) | |
| *H02K 9/22* | (2006.01) | |
| *H02K 11/04* | (2016.01) | |
| *H02K 15/14* | (2006.01) | |
| H02K 11/20 | (2016.01) | |

(52) U.S. Cl.
CPC .............. *H02K 5/10* (2013.01); *H02K 9/22* (2013.01); *H02K 11/01* (2016.01); *H02K 11/044* (2013.01); *H02K 11/33* (2016.01); *H02K 15/14* (2013.01); *H02K 11/20* (2016.01)

(58) Field of Classification Search
CPC .......... H02K 5/10; H02K 11/01; H02K 11/20; H02K 11/33; H02K 9/22; H02K 11/044; H02K 15/14; H02M 7/003

USPC ......................................................... 310/45
See application file for complete search history.

(56) References Cited

U.S. PATENT DOCUMENTS

| | | |
|---|---|---|
| 6,833,990 B2 | 12/2004 | LaCroix et al. |
| 7,786,635 B2 | 8/2010 | Gasser et al. |
| 8,324,769 B2 | 12/2012 | Clendenen |

(Continued)

FOREIGN PATENT DOCUMENTS

| | | |
|---|---|---|
| CN | 202888147 U | 4/2013 |
| CN | 203691321 U | 7/2014 |

(Continued)

OTHER PUBLICATIONS

EP Extended Search Report, Application No. 171865108.6-1809, dated Aug. 28, 2017, 8 pages.

(Continued)

*Primary Examiner* — Jianchun Qin
(74) *Attorney, Agent, or Firm* — Armstrong Teasdale LLP (57) ABSTRACT

An electric motor control system and methods of manufacture are provided. The system includes a power supply module including a printed circuit board (PCB) and a plurality of power processing components configured to convert an input voltage into an output voltage. The system also includes a motor management module including an encapsulated, heat-sharing package for housing a plurality of moisture-sensitive driver components configured to convert the output voltage from the power supply module and provide output voltages for application to windings of the electric motor.

24 Claims, 6 Drawing Sheets

(56) References Cited

U.S. PATENT DOCUMENTS

| | | | |
|---|---|---|---|
| 8,453,772 B2* | 6/2013 | Brown | B60W 20/10 180/65.285 |
| 2013/0036305 A1 | 2/2013 | Yadav et al. | |
| 2014/0175956 A1 | 6/2014 | Wu et al. | |
| 2014/0265985 A1 | 9/2014 | Bonner, Jr. et al. | |
| 2014/0292125 A1 | 10/2014 | Kanda et al. | |
| 2015/0061556 A1* | 3/2015 | Mullin | H02P 6/20 318/400.11 |
| 2015/0115755 A1 | 4/2015 | Yamasaki et al. | |
| 2015/0325112 A1 | 11/2015 | McPherson et al. | |
| 2015/0348863 A1 | 12/2015 | Du | |
| 2016/0036305 A1 | 2/2016 | Kawata et al. | |
| 2016/0134178 A1* | 5/2016 | Acinas Lope | B62D 5/0406 310/64 |
| 2017/0264171 A1* | 9/2017 | Williams | H02K 11/33 |

FOREIGN PATENT DOCUMENTS

| | | |
|---|---|---|
| CN | 205070865 U | 3/2016 |
| JP | H07147648 A | 6/1995 |
| JP | 2010245329 A | 10/2010 |

OTHER PUBLICATIONS

EP First Office Action dated Aug. 3, 2018; Regal Beloit America, Inc. Application No. 17 165 108.6-121, 5 pages.
EP Office Action, dated Jan. 10, 2019, for related EP patent application No. EP 17165108.6 (5 pgs.).

* cited by examiner

ELECTRIC MOTOR CONTROLLER FOR HIGH-MOISTURE APPLICATIONS AND METHOD OF MANUFACTURE

BACKGROUND

The field of the invention relates generally to electric motor control systems, and more particularly, to moisture penetration protection for electric motor control systems used in high-moisture applications.

Electric motors are being utilized in a plurality of different heating, ventilation, and air conditioning (HVAC) applications (furnaces, heat pumps and air conditioners) with acceptable records of reliability. Although the reliability of electric motors has steadily increased through the years, there is an industry need for a moisture resistant electric motor to meet an increasing demand for longer warranties (e.g., from 1 year to 5-10 years). Moisture penetration is a leading cause of failures in electronic components of motor control systems, particularly in air conditioners and heat pumps where high-level humidity level typically occurs. Connectivity (e.g., integrity of signal connectors) is another leading cause of failures.

Present packaging processes in at least some known motor control systems include printed circuit board (PCB) mounted electronic components and cable connections for power and signal lines. Surface-mount thick film resistors used in the motor control systems are very sensitive to moisture penetration. When moisture penetrates the hardware electronics, silver migration at resistor terminals occurs and causes a resistance drop, resulting in a short circuit or disconnection. The connectors used for the power lines and the signal lines also provide a moisture penetration path, which impacts the overall moisture level of motor drive electronics inside the enclosure. In general, power lines of the motor control system input and connections carry higher current levels when the motor is running, so the resistive loss produced by the cable itself may reduce the surrounding moisture level. However, signal connections between the electric motor and the HVAC system controller typically carry very low current, so it cannot reduce the level of surrounding moisture. As a result, moisture penetrates the low power signal-level circuit, which includes numerous moisture sensitive components, and eventually results in a failure. As such, the known PCB-based packaging techniques do not provide a solution to moisture ingress over the desired warranty time, which causes field failures and additional expenses for consumers and motor suppliers.

BRIEF DESCRIPTION

In one aspect, an electric motor control system is provided. The system includes a power supply module including a printed circuit board (PCB) and a plurality of power processing components configured to convert an input voltage into an output voltage. The system also includes a motor management module including an encapsulated, heat-sharing package for housing a plurality of moisture-sensitive driver components configured to convert the output voltage from the power supply module and provide output voltages for application to windings of the electric motor.

In another aspect, a method of manufacturing an electric motor control system configured to be coupled to an electric motor is provided. The method includes coupling a plurality of power processing components to a printed circuit board (PCB) to form a power supply module. The power processing components are configured to convert an input voltage into an output voltage. The method also includes coupling a plurality of moisture-sensitive driver components within an encapsulated, heat-sharing package to form a motor management module. The moisture-sensitive driver components are configured to convert the output voltage from the power supply module and provide output voltages for application to windings of the electric motor. The method further includes electrically coupling the power supply module to the motor management module using high-voltage wires.

DETAILED DESCRIPTION

Figure 1:
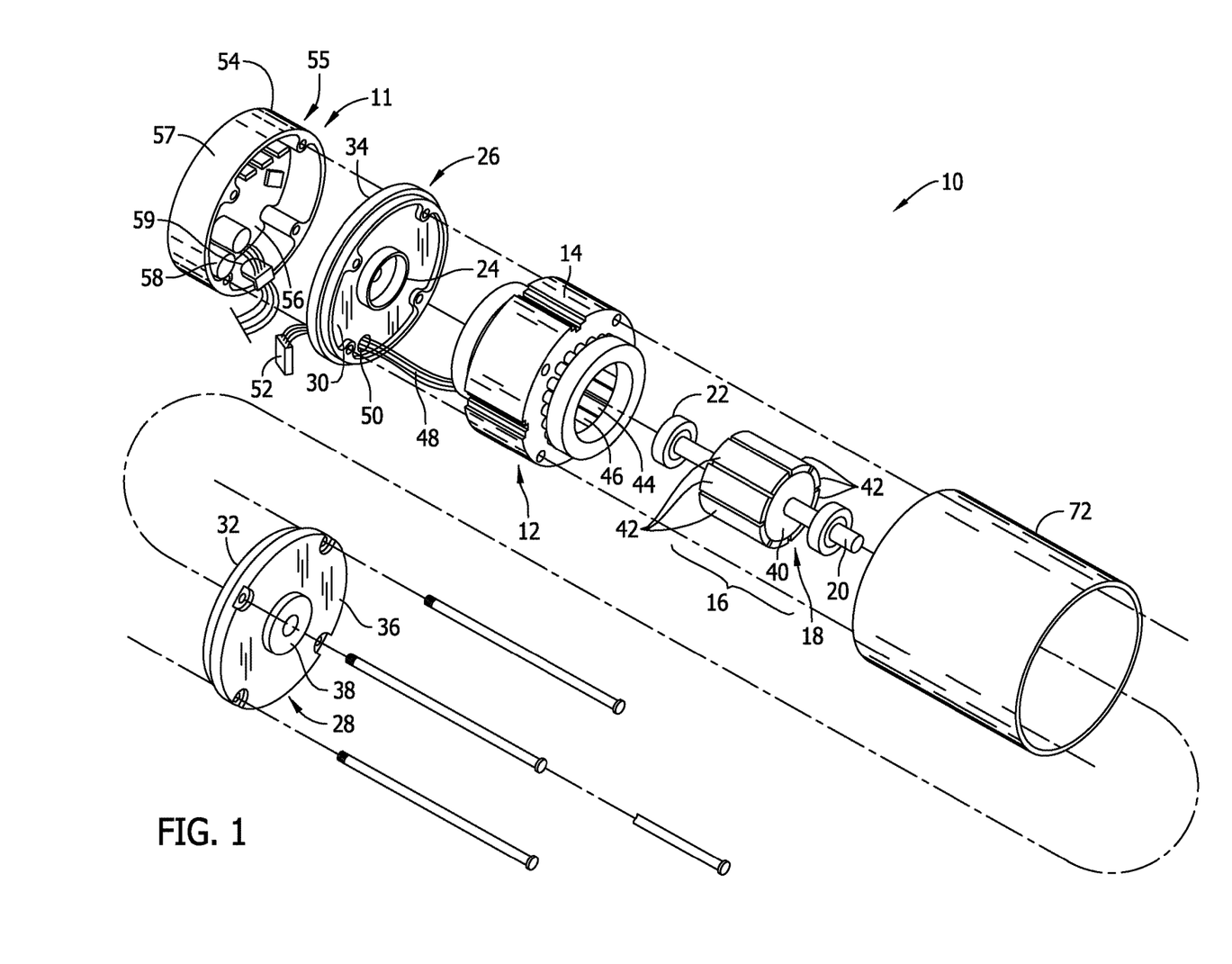
FIG. 1 is an exploded view of an exemplary electric motor.

FIG. 1 is an exploded view of an exemplary electric motor 10. Motor 10 includes control system 11, a stationary assembly 12 including a stator or core 14, and a rotatable assembly 16 including a rotor 18 and a shaft 20. In the exemplary embodiment, motor 10 is utilized as a fan and/or blower motor in a fluid (e.g., water, air, etc.) moving system. For example, electric motor 10 may be utilized in a clean room filtering system, a fan filter unit, a variable air volume system, a refrigeration system, a furnace system, an air conditioning system, and/or a residential or commercial heating, ventilation, and air conditioning (HVAC) system. Alternatively, motor 10 may be implemented in any application that enables motor 10 to function as described herein. Motor 10 may also be used to drive mechanical components other than a fan and/or blower, including mixers, gears, conveyors, and/or treadmills. In the exemplary embodiment, control system 11 is integrated with motor 10. Alternatively, motor 10 may be external to and/or separate from control system 11.

Rotor 18 is mounted on and keyed to shaft 20 journaled for rotation in conventional bearings 22. Bearings 22 are mounted in bearing supports 24 integral with a first end member 26 and a second end member 28. End members 26 and 28 have inner facing sides 30 and 32 between which stationary assembly 12 and rotatable assembly 16 are located. Each end member 26 and 28 has an outer side 34 and 36 opposite its inner side 30 and 32. Additionally, second end member 28 has an aperture 38 for shaft 20 to extend through outer side 34.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number, construction, and flux fields may be utilized with such other rotors within the scope of the invention.

Stationary assembly 12 comprises a plurality of winding stages 44 adapted to be electrically energized to generate an electromagnetic field. Stages 44 are coils of wire wound around teeth 46 of laminated stator core 14. Winding terminal leads 48 are brought out through an aperture 50 in first end member 26 terminating in a motor connector 52. While stationary assembly 12 is illustrated for purposes of disclosure, it is contemplated that other stationary assemblies of various other constructions having different shapes and with different number of teeth may be utilized within the scope of the invention.

Motor 10 further includes an electronics enclosure 54 which mounts on the rear portion of motor 10 to house control system 11. Electronics enclosure 54 and control system 11 may sometimes be referred to collectively as a motor control assembly 55. Electronics enclosure 54 includes a bottom wall 56 and a substantially annular side wall 57. Control system 11 includes a plurality of electronic components 58 and a connector 59 mounted within electronics enclosure 54. Control system 11 is connected to winding stages 44 by interconnecting motor connector 52. Control system 11 applies a voltage to one or more of winding stages 44 at a time for commutating winding stages 44 in a preselected sequence to rotate rotatable assembly 16 about an axis of rotation. In an alternative embodiment, control system 11 is remotely positioned from and communicatively coupled to motor 10. In another alternative embodiment, control system 11 is a central control system for more than one electric motor (e.g., in an HVAC system), and is communicatively coupled to motor 10.

A casing 72 is positioned between first end member 26 and second end member 28 to facilitate enclosing and protecting stationary assembly 12 and rotatable assembly 16.

Figure 2:
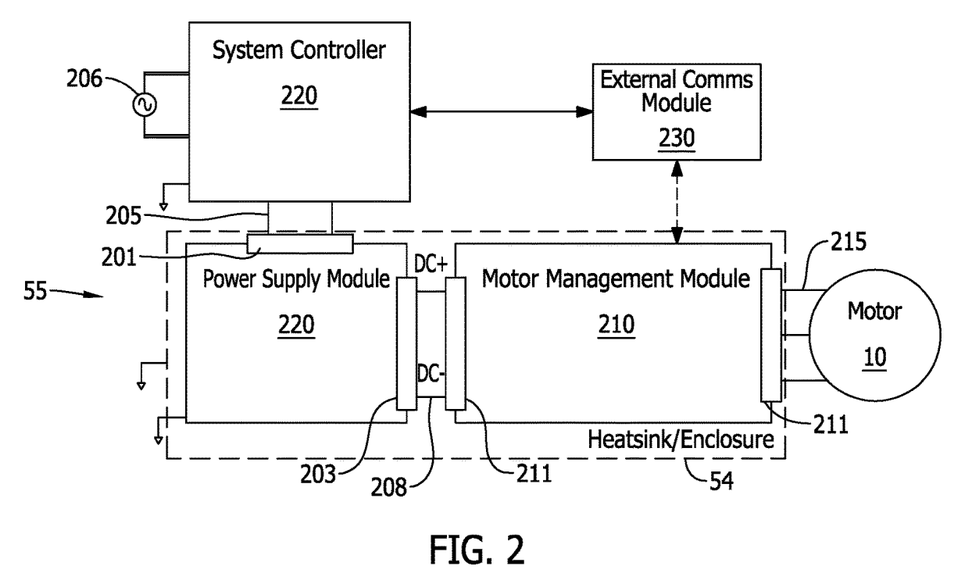
FIG. 2 is a block diagram of an exemplary motor control assembly for controlling operation of the electric motor shown in FIG. 1 including a motor management module for reducing moisture damage to signal components.
Figure 3:
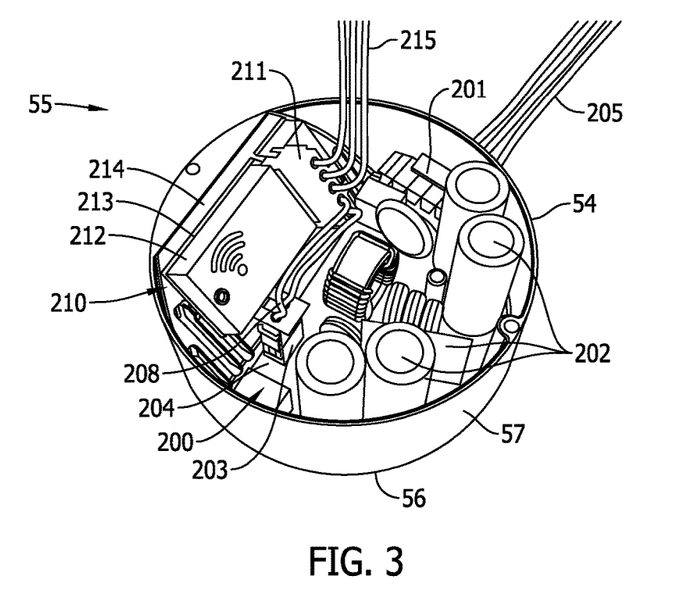
FIG. 3 is a perspective view of the motor control assembly shown in FIGS. 1 and 2 including the motor management module.
Figure 4:
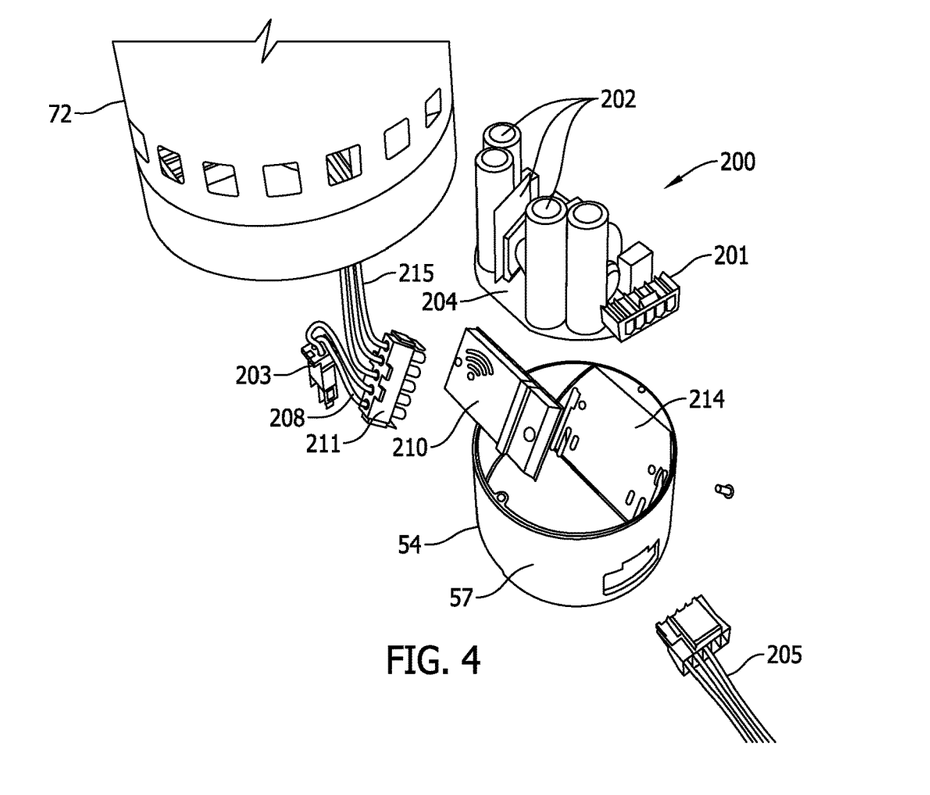
FIG. 4 is an exploded perspective view of the motor control assembly shown in FIGS. 1-3.
Figure 5:
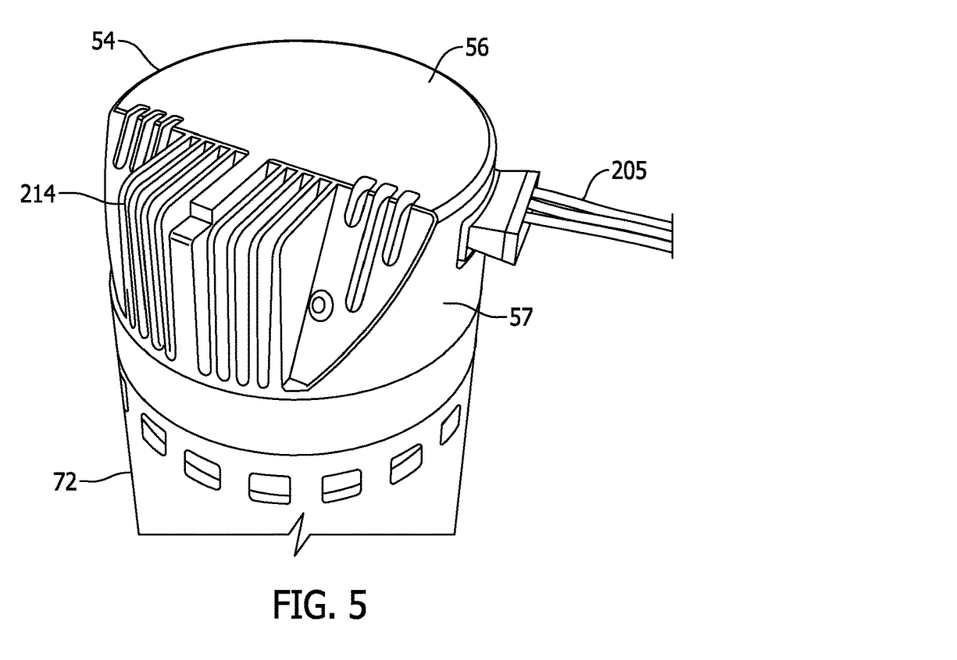
FIG. 5 is an assembled view of the motor control assembly shown in FIGS. 1-4 coupled to the motor shown in FIGS. 1 and 2.

FIG. 2 is a block diagram of an exemplary motor control assembly 55 (shown in FIG. 1) for controlling operation of electric motor 10 including a motor management module for reducing moisture damage to signal components. FIG. 3 is a perspective view of motor control assembly 55 including the motor management module. FIG. 4 is an exploded perspective view of motor control assembly 55. FIG. 5 is an assembled view of motor control assembly 55 coupled to motor 10. In the exemplary embodiment, motor control assembly 55 includes electronics enclosure 54, which houses control system 11. Control system 11 includes a power supply module 200 and a motor management module 210 that is physical separate from, but in electrical communication with power supply module 200.

Power supply module 200 includes an input connector 201 a plurality of electrical components 202, and an output connector 203 mounted on a component board, such as a printed circuit board (PCB) 204. Power supply module 200 integrates large through-hole electrical components and power connectors of control system 11 that are not sensitive to moisture. In the exemplary embodiment, PCB 204 is coupled to an interior surface of bottom wall 56 of electronics enclosure 54.

In the exemplary embodiment, input connector 201 includes power input line connectors 205 for coupling to a power source 206. Input connector 201 interfaces with and receives input power from power source 206 via an opening in side wall 57 of electronics enclosure 54. In some embodiments, power is supplied via a system controller 220, such as an HVAC system controller.

Electrical components 202 of power supply module 200 are configured to convert input voltage received from power source 206 to a desired level of direct current (DC) voltage. Using output connector 203, power supply module 200 outputs the converted DC voltage to motor management module 210. Output connector 203 includes two high-voltage wires 208 for providing the converted DC voltage to motor management module 210.

Figure 8:
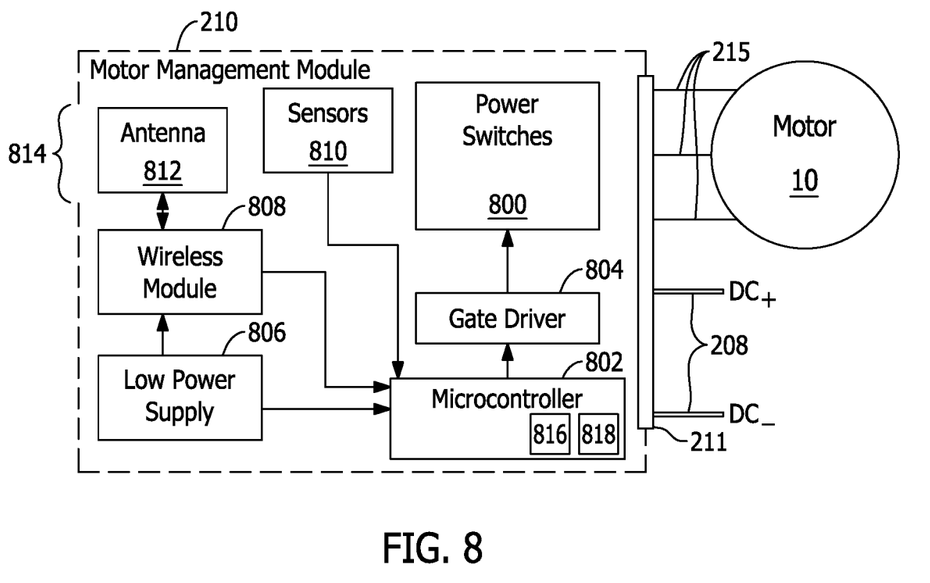
FIG. 8 is a block diagram of the motor management module shown in FIGS. 2-4.

Motor management module 210 includes an input/output connector 211 and electrical components (shown in FIG. 8). Motor management module 210 houses moisture-sensitive electrical components of control system 11 within an encapsulated, heat-sharing package 212 that provides protection from damage and/or failure due to moisture entering electronics enclosure 54, as described in more detail herein.

Heat-sharing package 212 includes an insulated metal substrate 213 coupled to a metal heatsink 214 formed in side wall 57 of electronics enclosure 54. For example, heat-sharing package 212 may include an insulated metal substrate (IMS) or a thick printed copper (TPC) based packaging to integrate high power semiconductor devices and all moisture-sensitive components such as integrated circuits and surface mount resistors. Heat generated by electrical losses of the semiconductor devices causes the elements mounted on the heat sharing package to operate at relatively higher temperatures. The higher operating temperatures cause moisture near the motor management module 210 to evaporate.

Heat-sharing package 212 includes a minimization of external connections. Included in connections to the external environment are the power connections (which naturally tend to be moisture resistant). These power connections include the DC power from power supply module 200 and the three phase AC power to motor 10. To provide the desired minimization of connections, the signal connections are made via a wireless connection to system controller 220. Heat-sharing package 212 includes an insulated metal substrate with an over-molded cover that is selected to substantially make a water tight protection of the interior components. Heat-sharing between the power transistors and the signal components is assured by the close proximity of these components and the common heat spreader of the metal portion of the metal insulated substrate which lies under all the components. It is this heat-sharing that is being relied on to aid in the exclusion of moisture that could eventually be taken up by the low level voltage signal circuitry.

Motor management module 210 including power semiconductors (IGBTs, MOSFETs or other) mounted on heatsink 214 and other components generate heat as they switch power to the motor windings. Electric losses of other switching elements such as the DC/DC converter also contribute to elevate the temperature of the package. The high operating temperature of heat-sharing package 212 evaporates standing water on motor management module 210, thus preventing water from penetrating inside motor management module 210.

Input/output connector 211 is coupled to high-voltage wires 208 for receiving the converted DC voltage from power supply module 200. Motor management module 210 converts the DC voltage to a three-phase alternating current (AC) voltage for driving electric motor 10 based in instructions received from an external device, for example, an HVAC system controller. Input/output connector 211 outputs the three-phase AC voltage to winding stages 44 of motor 10 via output power wires 215.

In the exemplary embodiment, an external communications module 230 is communicatively coupled to motor management module 210 as well as system controller 220. More specifically, in the exemplary embodiment, external communications module 230 is removably couplable to system controller 220 using a communication wire, and is communicatively coupled to motor management module 210 using wireless communication. However, external communications module 230 may also be communicatively coupled to system controller 220 using wireless communication. Alternatively, in some embodiments, external communications module 230 is integral to system controller 220. External communications module 230 is controlled by a user, such as an original equipment manufacturer (OEM), and enables control of motor operation by transmitting control signals to system controller 220 and/or motor management module 210.

Figure 6:
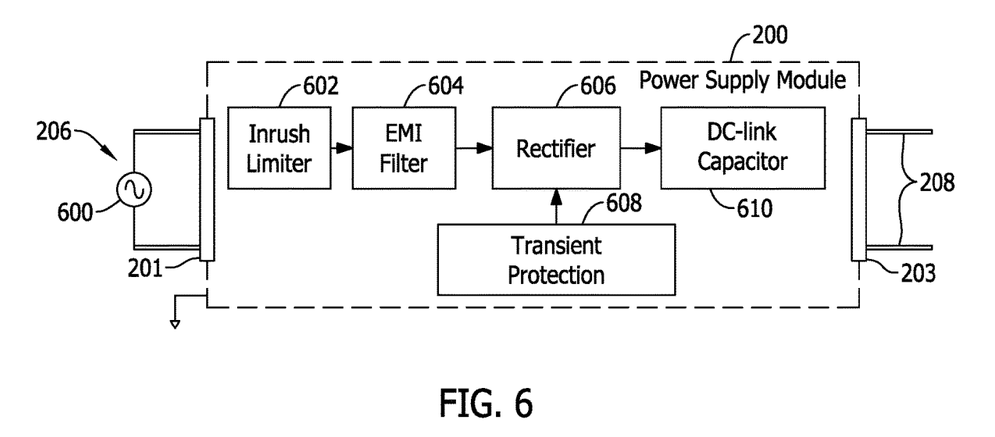
FIG. 6 is a block diagram of the power supply module shown in FIGS. 2-4 configured to receive input power from an AC power source.

FIG. 6 is a block diagram of an exemplary power supply module 200 (shown in FIGS. 2-4) configured to receive input power from an AC power source. In the exemplary embodiment, power supply module 200 is configured to receive AC power from power source 260. For example, in the exemplary embodiment, power source 206 is an AC utility or mains 600 that provides single-phase AC input voltage of 120V/240V/277V at 50/60 Hz.

In the exemplary embodiment, power supply module 200 includes input connector 201 for connecting to mains 600, an inrush limiter 602 for inrush current protection, an electromagnetic interference (EMI) filter 604 for reducing EMI, a rectifier 606 for converting AC voltage from mains 600 to DC voltage, a transient voltage protection device 608 for lightning or power surge protection of rectifier 606, at least one DC-link capacitor 610 to minimize voltage transients experienced during power switch operation, and output connector 203 to provide the resulting DC voltage to motor management module 210.

Figure 7:
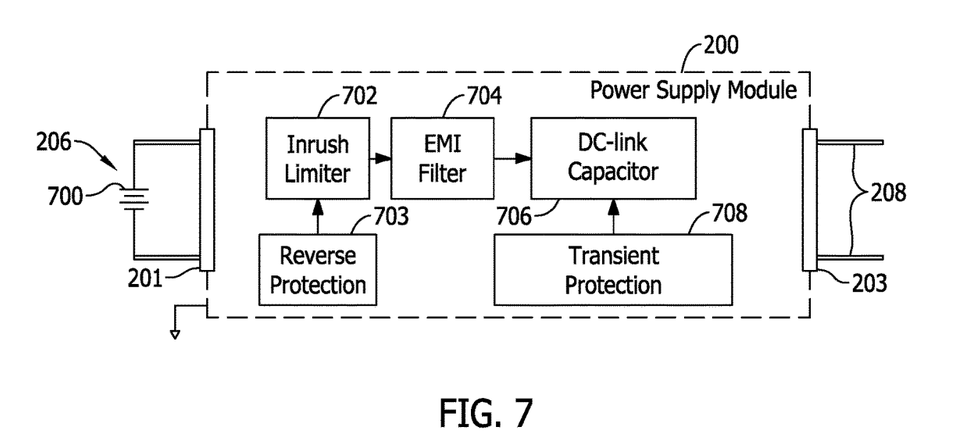
FIG. 7 is a block diagram of the power supply module shown in FIGS. 2-4 configured to receive input power from a DC power source.

FIG. 7 is a block diagram of an exemplary power supply module 200 (shown in FIGS. 2-4) configured to receive input power from a DC power source. In the exemplary embodiment, power supply module 200 is configured to receive DC power from power source 206. For example, in the exemplary embodiment, power source 206 is a micro-grid or nano-grid 700 that provides DC input voltage of about 380V.

In the exemplary embodiment, power supply module 200 includes input connector 201 for connecting to DC grid 700, an inrush limiter 702 for inrush current protection, a reverse protector 703 for providing protection from wire misconnection, an electromagnetic interference (EMI) filter 704 for reducing EMI, at least one DC-link capacitor 706 configured to provide local protection from switching transients caused by power switch operation, a transient voltage protection device 708 for lightning or power surge protection in DC-link capacitor 706, and output connector 203 to provide the resulting DC voltage to motor management module 210.

FIG. 8 is a block diagram of an exemplary motor management module 210 (shown in FIGS. 2-4). In the exemplary embodiment, motor management module 210 includes input/output connector 211 for receiving the DC voltage from power supply module 200, power semiconductor switches 800 for switching the DC power to the motor phases as AC power, a microcontroller 802 for implementing an algorithm to control one or more gate drivers 804 to operate power semiconductor switches 800, a low voltage power supply 806 and associated internal circuitry for providing low voltage power to microcontroller 802 from a higher voltage that is applied to entire motor management module 210, and input/output connector 211 for coupling to motor winding stages. In the exemplary embodiment, low voltage power supply 806 is a DC-DC converter that supplies low voltage sources to microcontroller 802 and to a wireless communications module 808.

In the exemplary embodiment, motor management module 210 also includes a plurality of sensors 810 for providing data to microcontroller 802. Sensors 810 are configured to measure various operating parameters associated with the operation of motor 10, including voltage measurements, current measurements, temperature measurements, vibration measurements, and/or any other known measurements associated with operating an electric motor or the operating environment. Sensors 810 are contained within heat-sharing package 212 and do not require penetration out of package 212, which would create potential for moisture penetration.

In the exemplary embodiment, motor management module 210 further includes wireless communication module 808 for communicating with an external device to receive a motor control command signal, which is used by microcontroller 802 to switch power semiconductor switches 800 to drive motor 10 at an appropriate level. Wireless communication module 808 communicates with one or more remote devices, such as external devices. In the exemplary embodiment, wireless communication module 808 converts a received wireless signal into a control signal that microcontroller 802 utilizes to control operation of electric motor 10. Wireless signals may include, but are not limited to, Bluetooth, Bluetooth low energy, near field communications (NFC), infrared, and/or any other known types of wireless signals. Using wireless communication to communicate with external devices enables elimination of hardwired communication connectors. Such hardwired connectors are a common entry point for moisture, so their removal makes motor 10 more resistant to moisture.

In some embodiments, casing 72 and/or electronics enclosure 54 are manufactured using metal, which may interfere with wireless signals being transmitted to microcontroller 802. As such, motor management module 210 may be positioned adjacent to an opening 814 defined in casing 72 or electronics enclosure 54. Motor management module 210 includes an antenna 812 within the over-molded portion of heat-sharing package 212 such that a wireless signal entering electronics enclosure 54 via opening 814 penetrates package 212 and is received by antenna 812. Antenna 812 enables wireless communication between a user of motor 10 (i.e., a manufacturer of motor 10, an HVAC system manufacturer using motor 10, a technician of motor 10, and/or a customer owning motor 10) with microcontroller 802 to define, change, or override the operating parameters stored in a microcontroller memory device. Positioning antenna 812 adjacent to opening 814 enables wireless signals to be received by antenna 812 and transmitted to microcontroller 802.

As described above, motor management module 210 includes heat-sharing package 212, which is formed of an insulated metal substrate. During operation, heat generated by electrical losses of power semiconductor switches 800 causes low power circuits to operate at relatively higher temperatures. The higher operating temperatures cause moisture near the motor management module 210 to evaporate, thus providing additional moisture protection for motor management module 210.

In the exemplary embodiment, microcontroller 802 includes at least one memory device 816 and a processor 818 that is communicatively coupled to memory device 816 for executing instructions. In some embodiments, executable instructions are stored in memory device 816. In the exemplary embodiment, microcontroller 802 performs one or more operations described herein by programming processor 818. For example, processor 818 may be programmed by encoding an operation as one or more executable instructions and by providing the executable instructions in memory device 816.

Processor 818 may include one or more processing units (e.g., in a multi-core configuration). Further, processor 818 may be implemented using one or more heterogeneous processor systems in which a main processor is present with secondary processors on a single chip. As another illustrative example, processor 818 may be a symmetric multi-processor system containing multiple processors of the same type. Further, processor 818 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 818 controls operation of microcontroller 802.

In the exemplary embodiment, memory device 816 is one or more devices that enable information such as executable instructions and/or other data to be stored and retrieved. Memory device 816 may include one or more computer readable media, such as, without limitation, an NFC electrically erasable programmable read-only memory (EEPROM), a standard EEPROM, dynamic random access memory (DRAM), static random access memory (SRAM), a solid state disk, and/or a hard disk. Memory device 816 may be configured to store, without limitation, application source code, application object code, source code portions of interest, object code portions of interest, configuration data, execution events and/or any other type of data. In the exemplary embodiment, memory device 816 includes firmware and/or initial motor configuration data for microcontroller 802. Moreover, in the exemplary embodiment, memory device 816 stores diagnostic data associated with operation of motor 10, for transmission to one or more external devices upon request. Diagnostic data includes, but is not limited to including, time powered, time run, time run above 80% demand, time in speed cutback region, time in temperature cutback region, good starts, failed starts, resets, stalls, number of bad serial packets received, watchdog shutdown events, time run in certain demand ranges, thermal shock events, power module temperature, bus voltage, open-phase events, UL lockouts, reverse start attempts, shaft watts, and torque.

Figure 9:
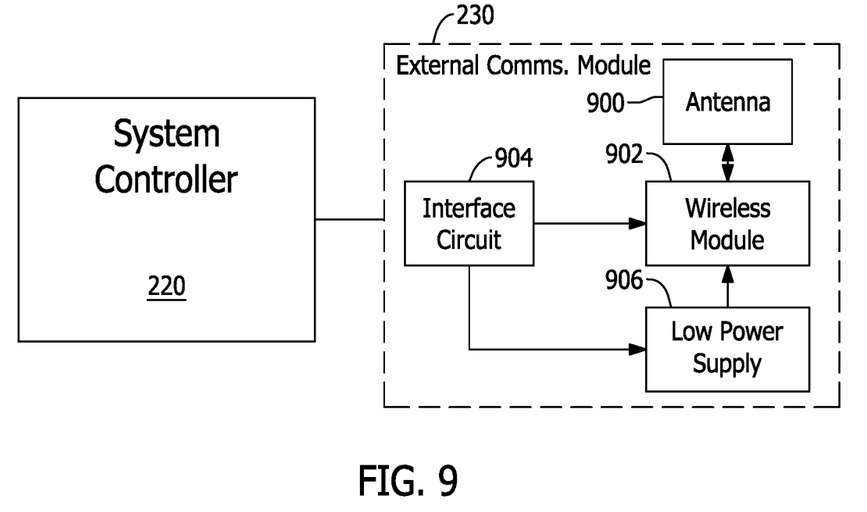
FIG. 9 is a block diagram of the system controller and the external communications module shown in FIG. 2.

FIG. 9 is a block diagram of system controller 220 and external communications module 230 (shown in FIG. 2). In the exemplary embodiment, external communications module 230 includes an antenna 900, a wireless module 902, an interface circuit 904, and a low power supply 906 which outputs 3.3V to power wireless module 902. Interface circuit 904 translates signals between system controller 220 and wireless module 902, and also receives power (24V AC) from system controller 220.

Figure 10:
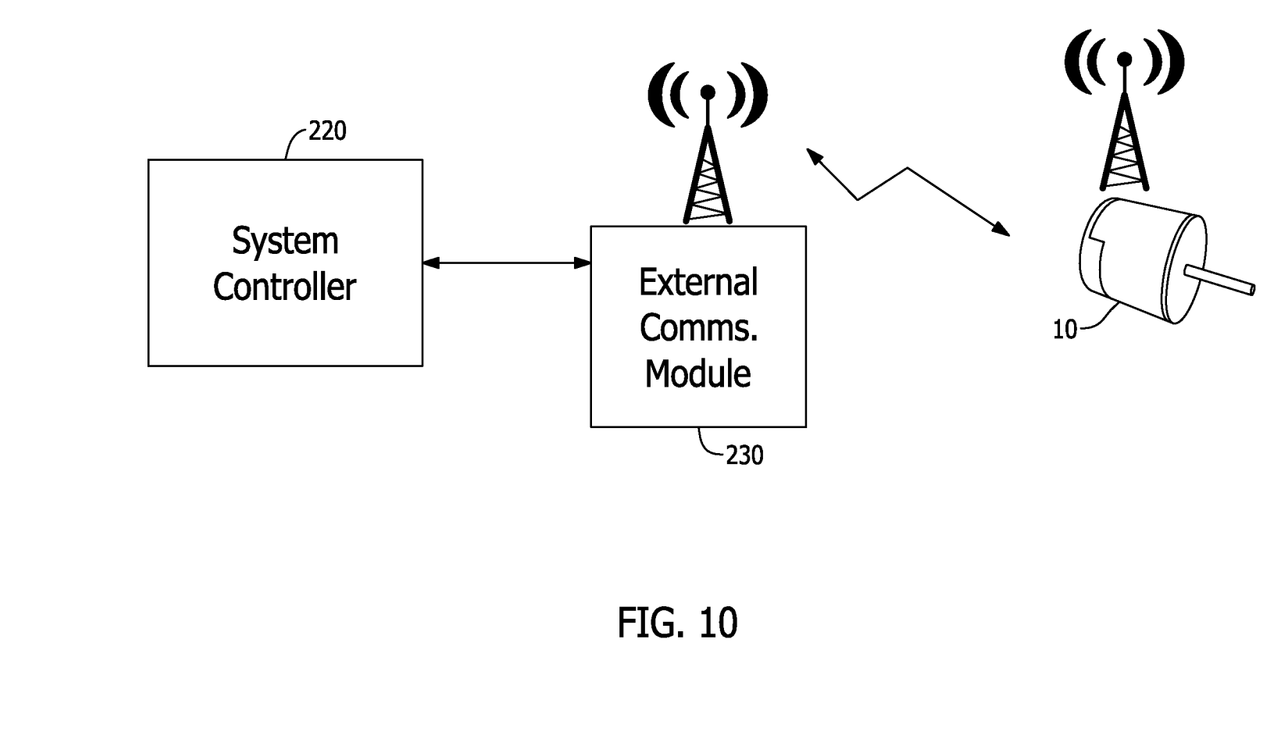
FIG. 10 is a block diagram showing communications between the system controller shown in FIGS. 2 and 9 and a motor via the external communications device shown in FIGS. 2 and 9.

FIG. 10 is a block diagram showing communications between system controller 220 and motor 10 via external communications device 230. In the exemplary embodiment, system controller 220 transmits a motor command signal to motor 10. More specifically, in the exemplary embodiment, system controller 220 transmits a motor command signal via wireless module 902. Wireless module 808 of motor management module 210 receives the motor command signal and operates power switches 800 to drive motor 10 in accordance with the motor command signal.

In one embodiment, motor 10 is used in a residential HVAC application, such as an air conditioner, a heat pump, and/or a furnace. System controller 220 is an OEM system controller with a thermostat. External communications device 230 enables communications between the OEM system controller and the thermostat, and wireless module 808 (shown in FIG. 8) of motor management module 210. A user selects a mode of operation on the OEM system controller (i.e., heating, cooling, or continuous fan). The thermostat measures and provides a temperature to the OEM system controller. Based on the selected mode of operation and the measured temperature, the OEM system controller transmits a motor command signal to motor 10. More specifically, in the exemplary embodiment, the OEM system controller transmits a motor command signal via wireless module 902. Wireless module 808 of motor management module 210 receives the motor command signal and operates power switches 800 to drive motor 10 in accordance with the motor command signal.

In another embodiment, system controller 220 is an external programming device that includes external communications device 230. The external programming device is a mobile computing device such as a smartphone, a tablet, or a laptop computer, and enables a user such as an OEM or a technician to configure, program, collect diagnostic information from, and/or perform field commissioning on motor 10. External communications device 230 enables communications between the external programming device and wireless module 808 (shown in FIG. 8) of motor management module 210. The external programming device monitors the building environment and transmits motor command signals to motor 10. More specifically, in the exemplary embodiment, the external programming device transmits a motor command signal via wireless module 902. Wireless module 808 of motor management module 210 receives the motor command signal and operates power switches 800 to drive motor 10 in accordance with the motor command signal.

The motor control system and methods described herein provide a two-module packaging design for the motor control system of an electric motor, particularly in HVAC applications. More specifically, a power supply module uses common printed circuit board (PCB) technology to integrate large through-hole electronic components and power connectors that are not sensitive to moisture. A motor management module uses an encapsulated, heat-sharing package to integrate high-power semiconductor devices and all moisture sensitive components such as ICs and surface mount resistors. The motor management module also eliminates all signal connectors for external communications devices by using wireless technology to prevent the penetration path of moisture into the motor control system. Additionally, the encapsulated, heat-sharing package provides additional moisture protection as heat generated by the plurality of moisture-sensitive driver components causes the low power supply to operate at a relatively higher temperature and evaporate moisture near the motor management module. By making the moisture-sensitive components less susceptible to moisture penetration and evaporating moisture near the motor management module, the motor control system and method described herein provide greater reliability and reduce the amount of electric motor failures due to moisture penetration, which results in decreased maintenance and operating expenses.

Some embodiments described herein relate to electric motors including electric motors and electronic controls. However, the methods and apparatus are not limited to the specific embodiments described herein, but rather, components of apparatus and/or steps of the methods may be utilized independently and separately from other components and/or steps described herein. For example, the methods may also be used in combination with any motor, and are not limited to practice with the electric motors as described herein. In addition, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

What is claimed is:

1. An electric motor control system configured to be coupled to an electric motor, said electric motor control system comprising:
   a power supply module comprising a printed circuit board (PCB) and a plurality of power processing components configured to convert an alternating current (AC) input voltage from a power source into a direct current (DC) intermediate voltage; and
   a motor management module encapsulated from said power supply module, said motor management module comprising a water proof heat-sharing package for housing a plurality of moisture-sensitive driver components configured to convert the DC intermediate voltage from said power supply module to an AC output voltage for application to windings of said electric motor, wherein heat generated by said plurality of moisture-sensitive driver components evaporates moisture near said motor management module.

2. The electric motor control system according to claim 1, wherein said plurality of power processing components comprises a plurality of non-moisture sensitive power processing components.

3. The electric motor control system according to claim 1, wherein
   said plurality of power processing components comprises:
      a reverse protection device configured to provide protection from wire misconnection;
      an inrush limiter configured to provide inrush current protection;
      an electromagnetic interference (EMI) filter configured to reduce EMI;
      a rectifier for converting the AC input voltage from the power source to the DC intermediate voltage;
      a transient voltage protection device configured to provide power surge protection for said rectifier; and
      at least one DC-link capacitor configured to minimize voltage transients experienced during power switch operation.

4. The electric motor control system according to claim 1, wherein said plurality of moisture-sensitive driver components comprises:
   a plurality of power semiconductor switches;
   a plurality of gate drivers configured to control switching of said plurality of power semiconductor switches;
   a microcontroller electrically coupled to said plurality of gate drivers and configured to control operation of said plurality of gate drivers; and
   a plurality of sensors configured to measure at least one of voltage, current, temperature, and vibration of the electric motor.

5. The electric motor control system according to claim 4, wherein said motor management module comprises a low power supply configured to convert the DC intermediate voltage from said power supply module into a low-voltage DC voltage source for application to said microcontroller.

6. The electric motor control system according to claim 1, wherein said motor management module comprises a wireless module configured to receive a motor control signal from an external device.

7. The electric motor control system according to claim 6, wherein said wireless module facilitates removal of physical connectors that provide a penetration path for moisture to enter said motor management module.

8. The electric motor control system according to claim 1, wherein said motor management module comprises a low power supply configured to convert the DC intermediate voltage from said power supply module into a low voltage DC voltage source for application to said plurality of moisture-sensitive components.

9. The electric motor control system according to claim 8, wherein the heat generated by said plurality of moisture-sensitive driver components causes low power circuits to operate at a relatively higher temperature and evaporate moisture near said motor management module.

10. The electric motor control system according to claim 1, wherein said heat-sharing package comprises one of an insulated metal substrate (IMS) and a thick printed copper (TPC) based packaging encapsulating said plurality of moisture-sensitive driver components.

11. The electric motor control system according to claim 1, wherein said power supply module is electrically coupled to said motor management module by only a first high-voltage wire and a second high-voltage wire, wherein the first and second high-voltage wires are configured to transmit the DC intermediate voltage from said power supply module to said motor management module.

12. The electric motor control system according to claim 1, further comprising an electronics enclosure having a bottom wall and a side wall extending from said bottom wall for coupling to the electric motor.

13. The electric motor control system according to claim 12, wherein:
   said electronics enclosure further comprises a heat sink formed within said side wall; and
   said motor management module is coupled to said heat sink.

14. The electric motor control system according to claim 1, wherein:
   said motor management module comprises a plurality of surface mounted components; and
   said power supply module comprises a plurality of through-hole mounted components.

15. The electric motor control system according to claim 1, wherein said motor management module comprises at least one sensor for measuring at least one of voltage, current, temperature, and vibration.

16. A method of manufacturing an electric motor control system configured to be coupled to an electric motor, said method comprising:
   coupling a plurality of power processing components to a printed circuit board (PCB) to form a power supply module, the plurality of power processing components configured to convert an alternating current (AC) input voltage from a power source into a direct current (DC) intermediate voltage;
   encapsulating a plurality of moisture-sensitive driver components within a waterproof heat-sharing package to form a motor management module, the plurality of moisture-sensitive driver components configured to convert the DC intermediate voltage from the power supply module to an AC output voltage for application to windings of the electric motor, wherein heat generated by the plurality of moisture-sensitive driver components evaporates moisture near the motor management module; and
   electrically coupling the power supply module to the motor management module using high-voltage wires.

17. The method according to claim 16, wherein encapsulating the plurality of moisture-sensitive driver components within the waterproof heat-sharing package comprises:
   coupling at least one of a plurality of power semiconductor switches within the waterproof heat-sharing package,
   coupling each gate driver of a plurality of gate drivers to the at least one power semiconductor switch, each gate driver configured to control switching of the corresponding power semiconductor switch; and
   electrically coupling a microcontroller to the plurality of gate drivers, the microcontroller configured to control operation of the plurality of gate drivers.

18. The method according to claim 16, further comprising encapsulating a wireless module within the waterproof heat-sharing package, the wireless module configured to receive a motor control signal from an external device.

19. The method according to claim 16, further comprising coupling a low power supply configured to convert the DC intermediate voltage from the power supply module into a low voltage DC voltage source for application to the plurality of moisture-sensitive driver components, wherein heat generated by the plurality of moisture-sensitive driver components causes low power circuits to operate at a relatively higher temperature and evaporate moisture near the motor management module.

20. The method according to claim 16, further comprising coupling the motor management module to a heat sink defined on a side wall of the electric motor control system.

21. The method according to claim 16, wherein encapsulating the plurality of moisture-sensitive driver components within the waterproof heat-sharing package comprises coupling the plurality of moisture-sensitive driver components within one of an insulated metal substrate (IMS) and a thick printed copper (TPC) based packaging.

22. An electric motor control system configured to be coupled to an electric motor, said electric motor control system comprising:
   a power supply module comprising a printed circuit board (PCB) and a plurality of power processing components configured to convert a direct current (DC) input voltage from a power source into a DC intermediate voltage; and
   a motor management module encapsulated from said power supply module, said motor management module comprising a water proof heat-sharing package for housing a plurality of moisture-sensitive driver components configured to convert the DC intermediate voltage from said power supply module to an output voltage for application to windings of said electric motor, wherein heat generated by said plurality of moisture-sensitive driver components evaporates moisture near said motor management module.

23. The electric motor control system according to claim 22, wherein
   said plurality of power processing components comprises:
      an inrush limiter configured to provide inrush current protection;
      an electromagnetic interference (EMI) filter configured to reduce EMI;
      at least one DC-link capacitor configured to convert the DC input voltage from the power source to the DC intermediate voltage at a different level of DC voltage; and
      a transient voltage protection device configured to provide power surge protection for said at least one DC-link capacitor.

24. A method of manufacturing an electric motor control system configured to be coupled to an electric motor, said method comprising:
   coupling a plurality of power processing components to a printed circuit board (PCB) to form a power supply module, the plurality of power processing components configured to convert a direct current (DC) input voltage from a power source into a DC intermediate voltage;
   encapsulating a plurality of moisture-sensitive driver components within a waterproof heat-sharing package to form a motor management module, the plurality of moisture-sensitive driver components configured to convert the DC intermediate voltage from the power supply module to an output voltage for application to windings of the electric motor, wherein heat generated by the plurality of moisture-sensitive driver components evaporates moisture near the motor management module; and
   electrically coupling the power supply module to the motor management module using high-voltage wires.

* * * * *